United States Patent
Popadic et al.

(10) Patent No.: US 8,590,940 B2
(45) Date of Patent: Nov. 26, 2013

(54) UBIQUITOUS IMAGING DEVICE BASED CHECK IMAGE CAPTURE

(75) Inventors: Robert P. Popadic, Wenham, MA (US); John R. Popadic, Wenham, MA (US); Thomas E. Gazda, Chelmsford, MA (US); Stuart J. Lipoff, Newton, MA (US)

(73) Assignee: Lighthouse Consulting Group, LLC, Wenham, MA (US)

( * ) Notice: Subject to any disclaimer, the term of this patent is extended or adjusted under 35 U.S.C. 154(b) by 0 days.

(21) Appl. No.: 13/088,068

(22) Filed: Apr. 15, 2011

(65) Prior Publication Data
US 2011/0310442 A1 Dec. 22, 2011
US 2013/0021651 A9 Jan. 24, 2013

Related U.S. Application Data

(63) Continuation of application No. 11/581,705, filed on Oct. 16, 2006, now Pat. No. 7,950,698.

(60) Provisional application No. 60/727,533, filed on Oct. 17, 2005.

(51) Int. Cl.
*B42D 15/00* (2006.01)
*B65D 27/00* (2006.01)
*G06Q 40/00* (2012.01)
*G07D 11/00* (2006.01)
*G07F 19/00* (2006.01)
*G06K 5/00* (2006.01)
*G06K 9/00* (2006.01)

(52) U.S. Cl.
USPC .............. 283/58; 283/70; 229/68.1; 235/379; 235/380; 382/137

(58) Field of Classification Search
USPC .................... 283/58; 281/38, 42, 45; 229/68.1
See application file for complete search history.

(56) References Cited

U.S. PATENT DOCUMENTS

| | | |
|---|---|---|
| 2,666,926 A | 1/1954 | Issacs |
| 3,043,506 A | 7/1962 | Bremer |
| 3,576,972 A | 5/1971 | Wood |
| 3,593,913 A | 7/1971 | Bremer |
| 3,800,124 A | 3/1974 | Walsh |

(Continued)

OTHER PUBLICATIONS

International Search Report based on International Application No. PCT/US2007/021424 mailed Jul. 28, 2008.

(Continued)

*Primary Examiner* — Kyle Grabowski
(74) *Attorney, Agent, or Firm* — Greenberg Traurig, LLP; Chinh H. Pham

(57) ABSTRACT

A method or corresponding apparatus for remote transmission of a negotiable instrument. In an example embodiment, the process provides a carrier that secures a negotiable instrument. Next, the process creates a unique identifier, associated with the carrier, and generates an electronic image of the negotiable instrument. After generating the electronic image, the process transmits the electronic image of the negotiable instrument and the unique identifier to a remote location. The negotiable instrument may be transmitted via a fax, a scanner, a device designed to transmit electronic data, other image device compatible with ITU-T recommendations T.30 or T.4, or combination thereof. The process may also verify the negotiable instrument has a valid endorsement, verify image quality of the electronic image to ensure compliance with financial industry standards, or validate any received security information.

10 Claims, 9 Drawing Sheets

(56) References Cited

U.S. PATENT DOCUMENTS

| | | | |
|---|---|---|---|
| 4,060,711 A * | 11/1977 | Buros | 283/58 |
| 5,594,225 A | 1/1997 | Botvin | |
| 6,598,800 B1 | 7/2003 | Schmit et al. | |
| 2003/0183685 A1* | 10/2003 | Steele Moore et al. | 235/379 |
| 2005/0086140 A1 | 4/2005 | Ireland et al. | |
| 2006/0045321 A1 | 3/2006 | Yu | |
| 2006/0102704 A1 | 5/2006 | Reynders et al. | |

OTHER PUBLICATIONS

Office Action cited in U.S. Appl. No. 11/581,705 mailed Jul. 21, 2008.

Office Action cited in U.S. Appl. No. 11/581,705 mailed Dec. 19, 2008.

Office Action cited in U.S. Appl. No. 11/581,705 mailed Jul. 24, 2009.

Office Action cited in U.S. Appl. No. 11/581,705 mailed Mar. 3, 2010.

Office Action cited in U.S. Appl. No. 11/581,705 mailed Jul. 30, 2010.

Office Action cited in U.S. Appl. No. 11/581,705 mailed Dec. 8, 2010.

* cited by examiner

UBIQUITOUS IMAGING DEVICE BASED CHECK IMAGE CAPTURE

RELATED APPLICATIONS

This application is a continuation of U.S. patent application Ser. No. 11/581,705, filed Oct. 16, 2006, now U.S. Pat. No. 7,950,698, which was subsequently filed as U.S. Reissue patent application Ser. No. 13/420,385, filed Mar. 14, 2012, which claims the benefit of and priority to U.S. Provisional Patent Application No. 60/727,533, filed on Oct. 17, 2005. Application Ser. No. 11/581,705 is hereby incorporated by reference.

BACKGROUND OF THE INVENTION

Banks today offer systems having remote check image capture from a business site using a dedicated check scanner attached to a computer. The advantages of this system to the customer include the convenience and cost savings of not having to go to the bank, the capability of making multiple deposits during a day, and placing checks into a collection stream after branch hours. In addition, customers also have cost savings and increased funds availability, which, in turn, results in either increased earnings or reduced borrowing costs.

Remote check image capture provides many benefits to the banking industry such as increased customer convenience, enhances bank revenue, improves customer retention, and reduces the cost associated with replacing customers. Further, remote check image capture may also increase an effective footprint of a bank branch (e.g., successfully serve customers at a greater distance from the branch). For example, new customers may be attracted even though they are far from the branch because the new customers can use remote check image capture. The added benefit of remote check image capture makes it easier to add new customers thus, the close rate of customer acquisition increases and the cost decreases. This technique is useful for banks with a limited sales force because it is cheaper, and requires no additional resources.

FIG. 1 is a block diagram of an existing remote check image capture system 100. Here the remote check image capture uses a dedicated check scanner 105 attached to a computer 110. Images, based on a scanned item(s) (not shown), and associated data are sent to a bank, via a data connection 115, or service bureau. Next, the system 100 receives the images 120. After the bank receives the images, image quality is assessed, security tests are performed, and the deposit is proved 125 (total deposit amount matches sum of check amounts, which can be read in various ways). If the bank offers image statements, "on us" items are processed as images after appropriate format conversion in Account Statement preparation 130, resulting in a statement 135. Similarly, if the bank chooses to send images 145 to check clearing 140 then no extra processing is required as long as the file format for images and data conform to industry standards. On the other hand, if the bank is returning checks to customers or the receiving bank does not accept the check images, a substitute check 150 must be created. The industry expectation is that over time all banks will both send and receive images.

Currently banks lack a way to offer low volume users (e.g., individuals or small businesses) of deposit transactions, a low cost way to use remote check image capture. Therefore, there is a need to use ubiquitous imaging devices (e.g. FAX machines, flat bed scanners) for check image capture. If ubiquitous imaging devices are used, banks and customers would get the same types of benefits as with higher cost check scanners, described in FIG. 1 without the costs associated with having a dedicated check scanner. This invention addresses this need by providing a system that is based on variable rather than fixed cost.

Moreover, the cost of substitute checks affects the economics of remote check image capture. Experience suggests that the added cost of producing a substitute check has only limited impact on customers who deposit only a few high value checks at a time. This type of customer is also an ideal candidate for using their existing FAX machine, flat bed scanner, or other ubiquitous imaging device to remote capture check images and make deposits.

BRIEF SUMMARY OF THE INVENTION

One method or corresponding apparatus of the present invention uses ubiquitous imaging devices (e.g. FAX machines or flat bed scanners attached to a computer) capable of reading a check carrier to capture and transmit check images to a bank. Next, preprocessing of the images is preformed to conform with the bank's existing image receiving capability. The image preprocessing takes place at a local or remote part of the network.

A benefit of image capture using ubiquitous imaging devices is that a bank's market expands to individual and business customers having only a few checks to deposit and those with larger volumes of checks who are not willing to pay for a dedicated check scanning device. That is, the technology of remote check capture image may be used without having to make an investment in new equipment.

BRIEF DESCRIPTION OF THE DRAWINGS

The following drawings are illustrative of embodiments of the invention and are not intended to limit the invention as encompassed by the claims forming part of the application.

DETAILED DESCRIPTION OF THE INVENTION

Figure 1:
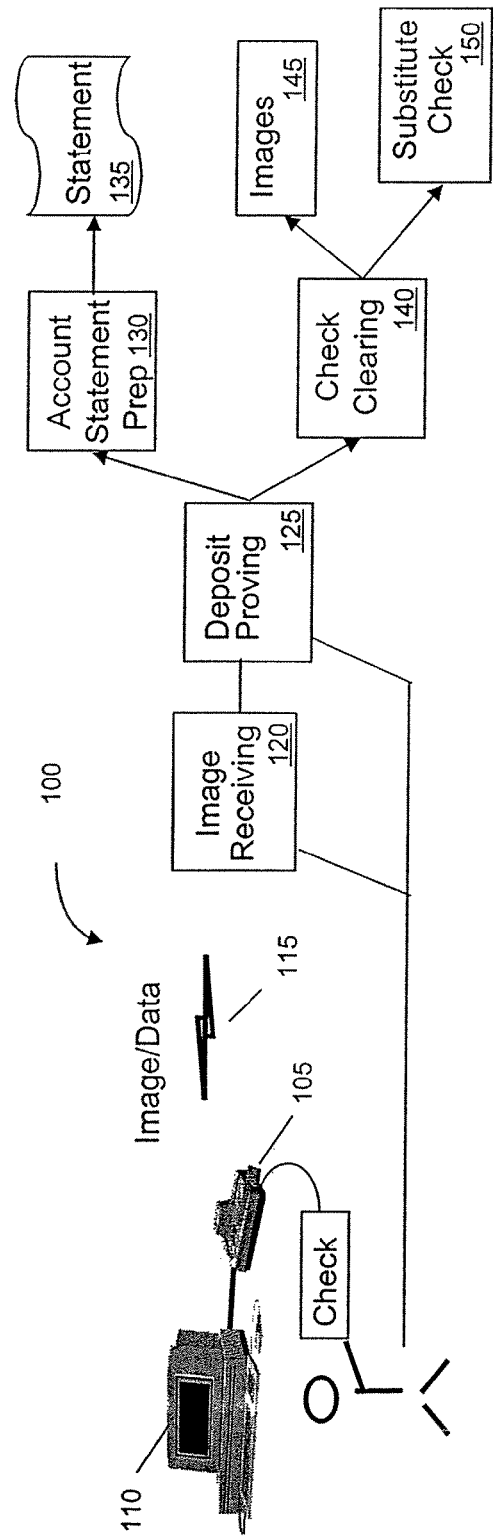
FIG. 1 is a block diagram of an existing remote check image capture process.

One embodiment of the present invention relates to a system 200 that captures check images using an existing fax machine 205, a computer with a flat bed scanner 210, or other ubiquitous imaging device (not shown). A carrier stores negotiable instruments 220 (e.g., a check or deposit slip) for transmission. Next, the system 200 sends the image and data over a communication line 225 via the fax machine 205. The fax machine 205 is compatible with group 3 fax devices implementing ITU-T Recommendations T.30 and T.4. Likewise, if the scanner 210 is used, the system 200 sends data over a communication line compatible with banking industry standards.

Each image device has different standards. In particular, images and related data conform to ANSI X9.100-180 standards (formerly X9.37), the requirements of the Federal Reserve, clearing houses, and image exchanges. Once the image is received and a deposit is proved 240, existing systems check images and data in the correct formats for the bank's account statements and check clearing. Alternatively, the system 200 generates a paper substitute check conforming to ANSI 9.100-140 and Federal Reserve Standards. It is useful to note when banks produce an account statement 255 (in Account Statement Prep 245) for their customers, they may use a different format than that used for image clearing with other banks Account statements 255 predate the exchange of images between banks Therefore, existing remote capture providers (such as NetDeposit, Creative Payment Solutions, Metavante) accept data from PCs and images captured by special purpose two sided scanners (Digital Check, Panini, Unisys).

The process delivers the functional equivalent of what users and existing system providers get from special purpose check scanners attached to a computer. This is achieved through the combination of carrier 215, imaging devices 205 and 210, communication links 225, and image pre processing 230 done before the images and data are handed over to the banks existing image receiving system 235. Alternatively the preprocessing functions are added to the receiving system's 235 existing software and the images received there instead of at a separate preprocessing device. It is also possible to have the image receiving system 235 feed a separate system to complete the deposit proving 240 and submit images for a statement 255 and check clearing 250.

In some instances a substitute check is needed 265. At this point, checks have been endorsed and marked processed, the account holder has been identified, front and back images have been combined, image quality confirmed, images and data converted to the format required for further processing, any necessary communications with the depositor conducted, and a delivery receipt issued to the depositor via fax, e-mail, or other means. Optionally, image enhancement has been applied using a fax test pattern included on the carrier, and/or using hints from data entered prior to fax transmission to improve machine readability of courtesy and legal amount.

Components of an example system are described below.

Carriers

One system component is a Carrier. The user prepares a deposit in much the same way as a deposit to be made at a bank branch. Checks are assembled and endorsed on the back (or on the front of the carrier in one variation), and the deposit ticket prepared (or the check amounts and totals entered on a deposit ticket incorporated into the carrier). Checks and deposit ticket are inserted into or attached to a carrier. Carriers may also be suitable for two-sided scans including: a) a transparent sealing carrier; b) a transparent non-sealing carrier, with or without pockets; and c) a non-transparent cut-out carrier. Single sided scans are possible if a user's bank permits the system to apply to the back side image either: 1) a standard endorsement; or 2) a copy of an endorsement made on the front of the carrier containing the check.

Figure 3:
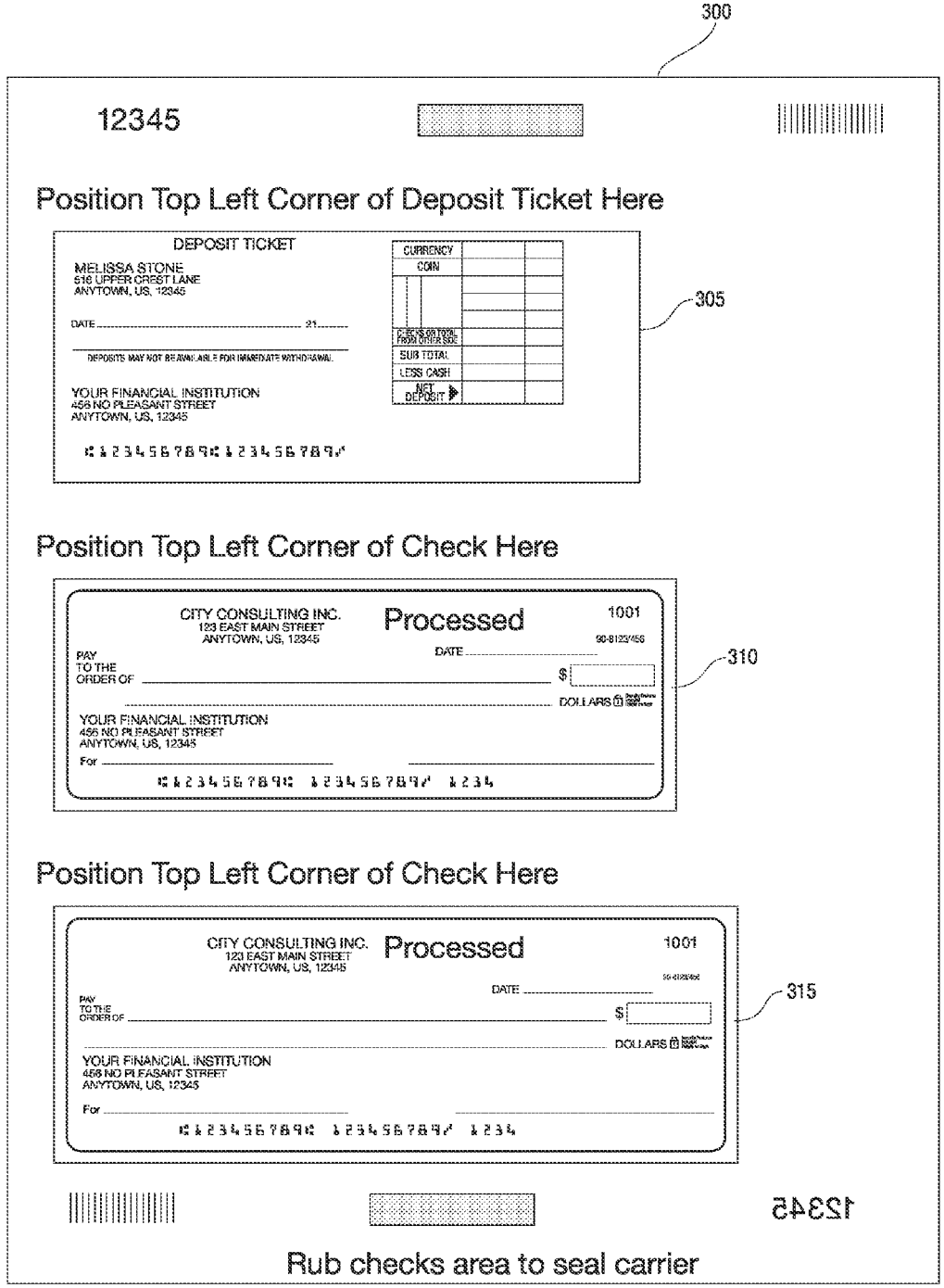
FIG. 3 depicts a carrier in an exemplary embodiment.

FIG. 3, depicts a carrier in an exemplary embodiment. The carrier contains a deposit ticket 305 and check A 310 and check B 315 enclosed. Later sections describe examples that may be included into a carrier as well as different types of carriers.

Fax Machines, Flat Bed Scanners, Etc.

Another system component is a scanning device used for a variety of commercial and personal purposes (e.g., not a special purpose check scanning devices). Such devices could include a Fax machine; a computer with a scanner, such as flat bed scanners, or other imaging device. Many computers have the ability to send faxes, as well as use other communications protocols (e.g. files attached to e-mails or the Internet). Fax machines may have a handset and numeric keyboard allowing the transmission of numeric data before the start of a fax transmission.

In order to serve the largest possible depositor base, an embodiment of this invention does not require any modification to these scanning devices. However, one may choose to test the image quality, as well as the capabilities and condition of an individual device before allowing a customer to submit deposits.

Communications Network

Figure 2:
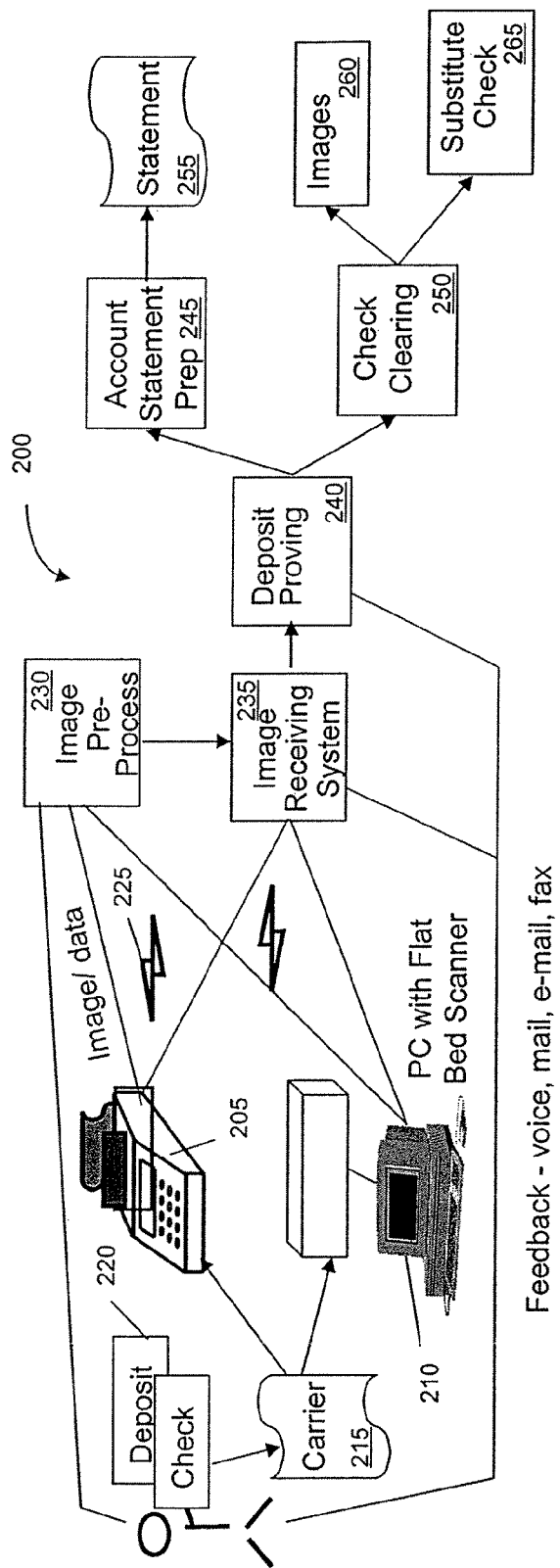
FIG. 2 is a block diagram of a remote check image capture process having an image device.

Yet another system component is a communications network. The communication network can be a dial-up phone network (generally used for faxes), or other protocol acceptable to image receiving and a pre processing module (e.g., 230 of FIG. 2), which might include e-mail or the Internet.

For Fax transmissions, whether originated by a Fax machine or by a computer employing the Fax protocol, a telephone connection is established with a receiving party. A sending device is identified in a number of ways. If the depositor calls an 800 number, the calling number is always available, since caller ID on 800 number calls cannot be blocked. Fax machines provide for user entry of identifying information, such as name and calling phone number, which is included in the Fax. This information can be used by the image receiving system to authenticate the depositor's sending device.

Image Receiving and Preprocessing Unit

Still yet another system component is an image receiving and preprocessing unit. Alternatively, this functionality may be incorporated into a bank's existing image receiving unit. Nonetheless, the image preprocessing unit receives the fax and data transmission, identifies the depositor, combines the fronts and backs of checks, assesses image quality, optionally enhances image quality, reads key data off the images using an OCR, optionally enhances the reading with "hinting algorithms", communicates with the depositor, reformats images and data to make them acceptable to the bank's existing remote image capture system, and facilitates the exchange of communication between the depositor and the system.

Carrier Features

Carriers are a unique assemblage of materials, for the most part commercially available and may include the following features. These features provide the following benefits: a) ensure the proper positioning on the carrier of checks and deposit tickets; b) facilitate matching fronts and backs of carriers; c) provide assurance that the deposit is coming from the accountholder, not someone else; d) prevent a check being deposited more than once either by remote capture or at a branch of any bank; and e) improve image readability. Not all features discussed in this application will necessarily be used in every embodiment of the invention. Instead a user (e.g., banks/financial institutions and carrier suppliers) may select a certain feature or features.

Registration, Adhesive, and Pockets

Figure 4:
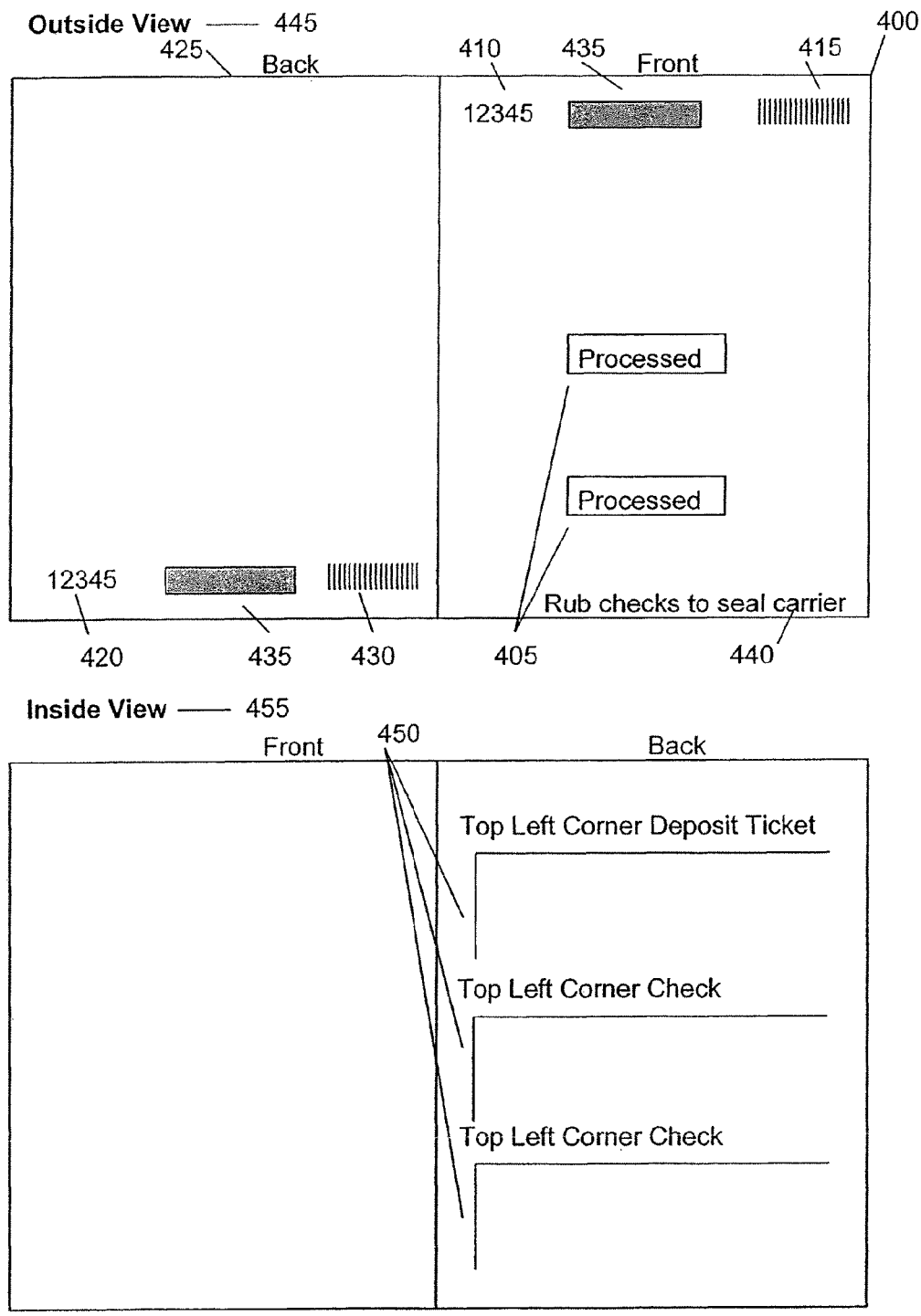
FIG. 4 depicts the front and back layout of a two-sided carrier.

FIG. 4 depicts the front and back layout of a two-sided carrier used for storing a negotiable instrument. More specifically, to insure a deposit ticket or check is in the appropriate position on a carrier 400 a variety of techniques can be used. For example, printed registration marks 450 may be used to help the user position the negotiable instrument. Another way to align a negotiable instrument in the carrier is to align the corner and horizontal line to minimize scanning skew, and ensure that "processed" markings 405 are outside the area on the negotiable instrument generally used for payee, legal amount, and courtesy amount. Registration marks may be used to align either the top or bottom of the check. Positioning can be maintained with a variety of standard commercial methods such as: permanent and reposition able adhesives, pockets and static cling.

Retention

Redeposit of checks previously submitted by remote image capture is a concern of the banks, even though depositors are responsible for preventing redeposit. Items deposited a second time through the same remote capture system are fairly easily detected by comparing the check data (routing, account number, check number, and amount) to checks previously deposited. To minimize the risk of redeposit, particularly at branches and at other banks, the check can be either partly or entirely sealed in a carrier 400, or attached with adhesive to the carrier in such manner that it cannot be removed without damage to the face of the check (not shown).

Sealing in Plastic

In one embodiment of the carrier 400 a check is permanently retained. In this case, the carrier 400 may consist of a clear front self adhesive sheet paired with a matching clear rear sheet. After aligning the deposit ticket and checks with registration marks on the inside of the rear sheet, the user closes the carrier, rubs designated areas of the carrier creating a permanent seal; and transfers to the check either a visible or invisible until pressed "processed" marking 405.

Sealing of the carrier may be accomplished in a number of ways. For instance, the inside of one sheet may be coated with a tacky adhesive with a high affinity for paper so that any attempt at removing the check would result in obvious damage. The adhesive may be applied over the entire area that would contact a check, or may be applied in one of a variety of patterns that would overlap the face of the check. Alternatively, the adhesive need not necessarily provide a full bond of the two parts of the carrier as long as it strongly adheres to the face of the check in whole, or in a pattern over the face.

Optionally, the sheets can be designed in such a way that a cryptographically or otherwise generated number or bar code would not be visible until the two front and back sheets are mated together in permanent seal with the check trapped in-between the front and back sheet. This may be accomplished with chemical treatment of the front and back sheets to hide the image of the number or bar code until the two sheets mate.

Other techniques, such as optical interference pattern, also permit hiding the verification code until the checks have been encapsulated in the carrier. The image receiving system, by checking the transmitted image for the presence of the number or bar code, determines a carrier has been sealed thus preventing its reuse and undamaged removal of the check and thus redeposit.

Attachment with Permanent Adhesive

In non-sealing carriers, negotiable instruments such as checks can be attached to the carrier using any of a number of methods, such as a self adhesive glue strip pre-applied to the carrier. The use of a permanent adhesive may reduce the likelihood of redeposit because the check could not be removed without some damage. In the case of the cut out carrier, damage would be restricted to a small part of the top edge and left side of the check.

Sequence Number and/or Bar Code

Referring now back to FIG. 4, the carrier 400 has a place for either entering deposit data or for inserting a prepared deposit ticket, and places for checks to be inserted so that relevant information is together. The carriers have a unique security/sequence number on both the front 410 and back 420, which facilitates pairing front 410 and back 420 images transmitted separately and detecting checks deposited more than once. To facilitate machine processing of the security/sequence numbers, the carrier could have the sequence numbers and/or bar codes 415 pre-printed in such a manner as to be easily read by an image processing system at the receiving bank. In this way, even if the front and back of the check are sent as separate fax transmissions at different times, it would still be possible to match up the correct front and back of a particular check.

An optional way to implement sequence numbers and bar codes on transparent carriers is to pre-print this information on both sides of the deposit ticket. One advantage of this approach is that a standard carrier, without any customized information, is used, thus reducing costs. Even though one may choose to reuse the carrier, the preprocessing/receiving unit could detect the reuse by comparing the sequence number to ones already used and, in turn, reject the deposit.

In another embodiment, the numbers and bar codes are printed on one side of a two sided carrier and provide the ability to match front and back. This is so since numbers and bar codes print direct (without a solid background color underneath the printing) on a transparent carrier and are read through the other side of the carrier. It is useful to note that there may be some image degradation because reading is done through two layers of carrier.

In an option to enhance security, the carrier or sequence number deposit ticket provider would keep track of which items were related to which depositor/account. The receiving system could then interrogate a database to determine if the carrier was valid for use by the depositor.

Yet another security option, cryptographic techniques are used to generate a unique number and/or bar code, whose validity is checked by the receiving system. One embodiment is uses the sequence number and account to generate a code. With generic carriers (e.g., no preprinted sequence number or bar code) where users print selected information at the time of use, the code could also be based on the date of transmission and other variable information, such as the amount of the check. One skilled in the art may also use a number of so called "hash" algorithms to cryptographically generate a number based on the input of other data. An example of such an algorithm is the SHA-1 Secure Hash Standard, FIPS PUB 180-1, by US government standards agency NIST (National Institute of Standards and Technology).

Processed Marking

In another embodiment, a mark such as "Processed" is placed on a negotiable instrument to prevent re-processing. A receiving system would look at the image for the marking to determine that the check has been properly marked and that the deposit should be processed. If the processed marking is not properly applied to the check this would be evident in the image and the deposit rejected. Optionally, the processed marking could include a difficult to copy unique design feature that differentiates it from other processed markings.

Processed marking is one of a number of approaches used to alert branch personnel and other remote capture systems to scrutinize the item before allowing deposit. Redeposit into the system used by the depositor's bank is prevented by comparing check number, amount, routing and account number to checks already deposited.

A number of methods can be used to mark the check processed. In a sealing carrier, the "Processed" notation is incorporated into the front of the carrier that adheres to the check. Other techniques include, in a designated area on the check, placing the word "Processed," or using a rubber stamp to stamp "Processed". Positioning on the check is not assured and carrier reuse would not necessarily be prevented, and in the latter case, a stamp would have to be provided to all carrier users. More attractive implementations include: 1) using pressure to transfer visible or otherwise invisible until rubbed ink to the check from the carrier; or 2) placing on the check a sticker/label whose removal would damage the check.

Pressure Transferred Ink

In this embodiment, the word "Processed" is contained in microencapsulated ink and placed in a designated and identified area on the back side of the transparent front sheet of the carrier. A preferred location is near a top registration guide, in an area not likely to obscure: to whom paid, the courtesy amount, the legal amount, or the MICR information. Text on the carrier would indicate this area must be activated prior to transmission of the deposit. Activation would be accomplished by rubbing the designated area, resulting in the crushing of the microcapsules, which are arranged to spell out "processed". This would result in the contained ink to preferentially migrate to and penetrate the check paper, spelling out the word "Processed."

In still yet another embodiment, a similar designated area would contain a colored polymeric adhesive material printed in a visible pattern where the word "Processed" selectively adheres to the check surface. The designated area, when rubbed, would transfer the word "Processed" to the surface of the check where it would permanently adhere. If the check were subsequently removed from the carrier, it is marked, but in addition, the designated area of the carrier would now contain a reverse image of the word "Processed" from where the material was transferred. The word "Processed" prevents reuse of a carrier, since a fax transmission containing a reverse or negative image of the word "Processed" is rejected.

Permanent Adhering Stickers/Labels

In another embodiment, a single sheet or cut-out carrier is used, stickers/labels preprinted with "Processed" are provided and are affixed by a user to a negotiable instrument in a designated upper middle portion of the document. Such labels are made from common label stock having a permanent adhesive. The labels and their release liners are attached to the carrier outside of the check area with the instruction that one be transferred to each check.

The stock might be similar to commercially available permanently adhering label material supplied by Avery Dennison Corporation. Opaque materials such as or similar to: Postage Meter Labels (Avery product 05288 or 05289), or Mailing Labels (Avery product 5267 or 8167). More acceptable to bankers might be labels produced on clear polymer stock with the word "Processed" imprinted in black, because this stock would not significantly obscure any part of the face of the check (e.g., Avery Product 5667).

An alternative to providing the preprinted labels on each carrier, would be to provided them in sheet form in an amount consistent with the number of checks that might be deposited using a set number of carriers, for instance, two hundred labels for one hundred carriers having the ability to include up to two checks each.

Half Tone Grid

A half-tone grid used to enhance image quality may be incorporated into transparent cover sheets. The grid performs much the same function as the photo-mode, available on some fax machines. The use of this grid improves the quality of continuous tone images (i.e. images which have a gray scale and are not just black and white) which would then be sent using conventional Group 3 (G3) fax transmission standards. This is so because G3 fax transmission standards support monochrome high contrast (e.g. black and white images). By use of the half-tone grid such continuous tone original images are effectively transformed into monochrome high contrast images suitable for fax transmission.

Test Pattern

In embodiments, a test pattern is included on the carrier and used to improve the calibration of the OCR software reading the image. The test pattern might include a series of printed bars ranging from black to various shade of gray to white. By comparing the received image to a known standard used to create the printed bars, the receiving system determines at what gray level the sending fax made the determination to send black or white. With this information the image enhancing and/or image reading software (Courtesy Amount Read and Legal Amount Read) could make a determination when an area imaged as black or white should be the reverse.

Carrier Variations

It is useful to note that the features described above may be employed in a variety of carrier implementations: transparent and opaque, sealing and non-sealing, single and double sided scanned, and inserted and incorporated deposit ticket. Below are some example carriers.

Transparent Sealing Two Sided Carrier

A non-reusable, self adhesive transparent, flexible, non-glare two sided check carrier that easily follows the paper transport path of imaging devices so equipped, assures: image quality, deposit ticket information and checks stay together, and that front and back images can be paired up (the front and back may be transmitted separately).

Referring again to FIG. 4 that depicts an outside view 445 and an inside view 455 having a front and back layout of a two-sided carrier used for storing a negotiable instrument. This carrier 400 consists of a transparent sheet that, when folded and closed, the two sides adhere, in one or more areas, to each other and to the enclosed documents 425, and incorporates a sequence number 410, bar code 430, test pattern 435, a processed legend 405 that transfers with pressure from the inside of the front cover to the check, a place with registration marks and reposition able adhesive for affixing the deposit ticket and check(s) 450, and a notation to rub the checks to seal the carrier 440.

Transparent Non-Sealing Two Sided Carrier

A non-reusable, transparent, flexible, non-glare two sided check carrier, with or without pockets, that easily follows the paper transport path of imaging devices so equipped, assures: image quality, deposit ticket information and checks stay together, and that front and back images can be paired up (the front and back may be transmitted separately).

Figure 5:
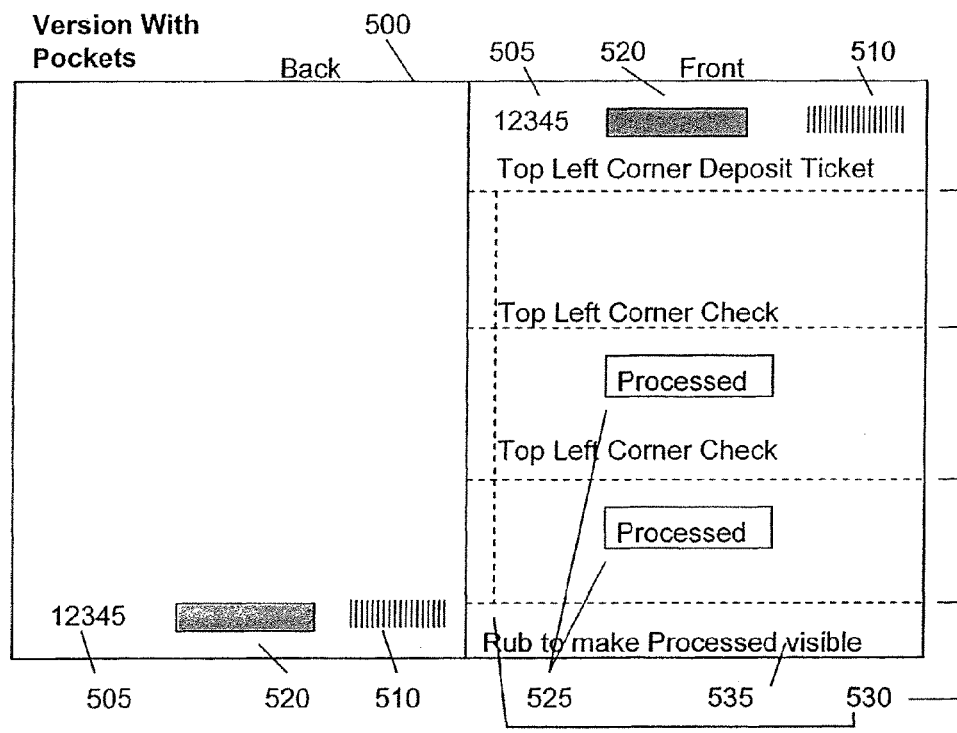
FIG. 5 depicts a transparent non-sealing carrier capable of storing negotiable instruments.

FIG. 5 depicts a transparent Non-sealing Carrier capable of storing negotiable instruments. More specifically, a non-sealing carrier with two sided scan having pockets is shown. This carrier consists of two transparent sheets sealed on up to 3 sides 500, pockets for deposit ticket and checks, with a notation above the pocket seam reminding depositors to align the check against the left and top edges of the pocket 530; and incorporates a sequence number 505, bar code 510, test pattern 520, a processed legend transferred by pressure from the inside of the front cover to the check 525 (e.g., a negotiable instrument), and a reminder 535 to rub to transfer the processed legend.

Cut Out Carrier

Figure 6:
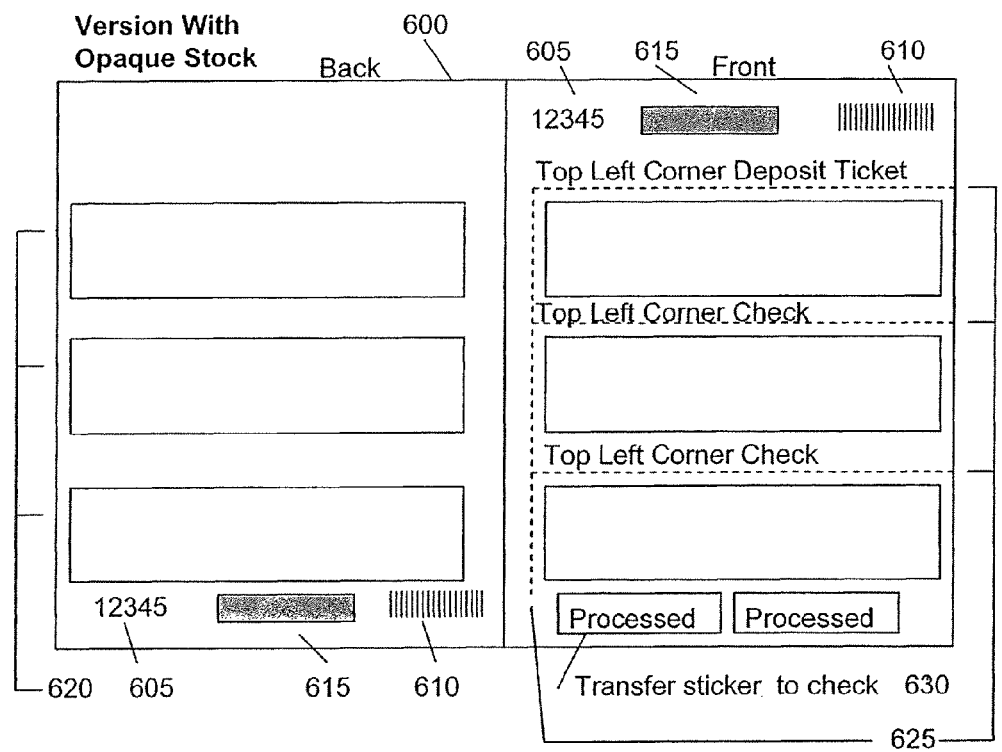
FIG. 6 depicts a cut out carrier with a two sided scan.

FIG. 6 depicts a cut out carrier with a two Sided Scan. The carrier with a fixed or adjustable cut out avoids, all or in part, the need for a transparent carrier. This carrier is an opaque piece of heavy paper or light card stock 600 with cutouts over which the checks and deposit ticket would be secured 620, and incorporates a sequence number 605, bar code 610, test pattern 615, registration marks and adhesive for affixing the deposit ticket and check(s) 625, and a legend 630 reminding the depositor to transfer the "Processed" sticker/label to the face of the check. A user transfers to the check the "processed" legend by removing a sticker from elsewhere on the carrier and placing it on the check in the appropriate area, or place the legend on the check using one of the other methods for so doing described earlier.

The cut out area is large enough to accommodate business checks. Items would be position in the upper left hand corner of the cut out secured on the carrier by a thin band of adhesive at the top or leading edge of the cut out area. Either permanent adhesive or reposition able adhesive, similar to the 3M Company "Post-it" product, can be used. The top or leading edge of the item is adhered to the carrier so that only a small portion (about ¼ inch) of the back of the item is not visible through the cutout area. This embodiment allows imaging of the front and back of items without use of an overlay.

By eliminating the clear plastic overlay on top of the check, issues such as image degradation due to reflection from the plastic and miss feeds due to a poor match between the friction of the plastic versus a normal paper carrier would be avoided. However because the point of adhesion between the carrier and the check lacks the protection the transparent carrier provides, the likelihood the deposit ticket or check may move during scanning is greater, particularly when using a reposition able adhesive and a fax machine that moves the carrier through the machine. Devices that have a flat copy glass are less likely to have this problem.

One Sided Carrier

A one-sided carrier (transparent or opaque) for transmitting only an image of the front of the check with either: a) the depositor placing the endorsement on the front of the carrier and the bank's receiving preprocessing unit applying it to a system created blank check back image; or b) no endorsement and the bank's receiving preprocessing unit applying the customer's standard endorsement to a system created blank check back image.

While it may be required to send for collection images of both the front and back of checks, the back, for other than third party checks, will normally be blank. Thus, instead of applying the endorsement to the back of the check and then placing the check in a two sided carrier, it is possible to have a one-sided carrier with space for the endorsement on the front of the carrier on the same side as the check. In the event a third party check needs to be deposited, the endorsement can be copied unto the single side of the carrier, or the check can be sent through twice-first the front and then the back. As with the double-sided carrier a number of different implementations are possible.

Figure 7:
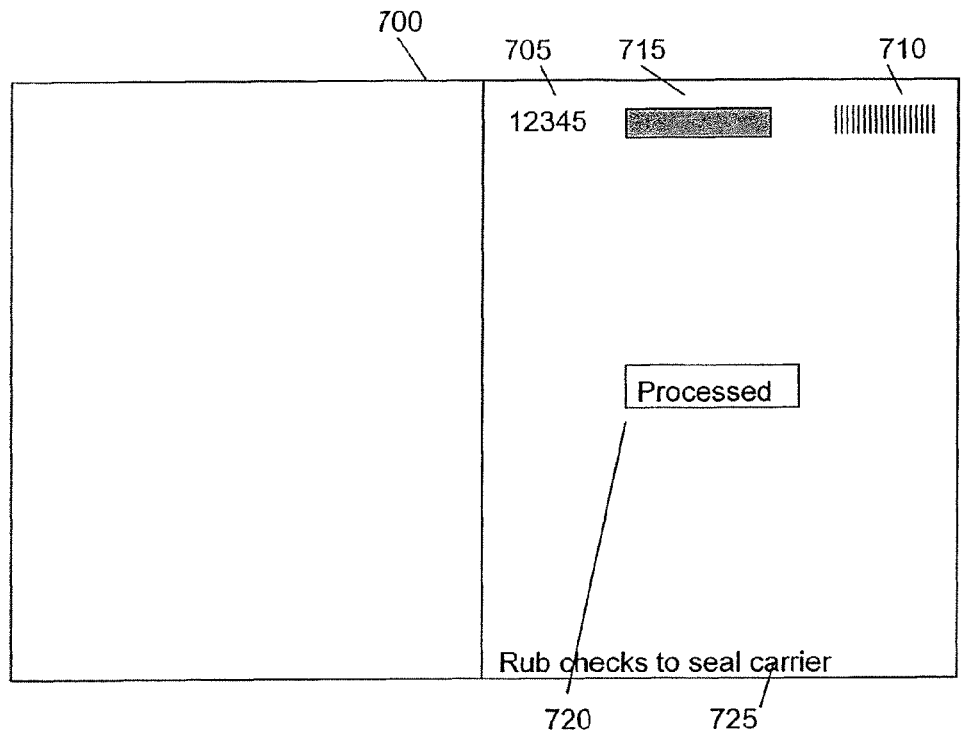
FIG. 7 depicts a single sided carrier.
Figure 7:
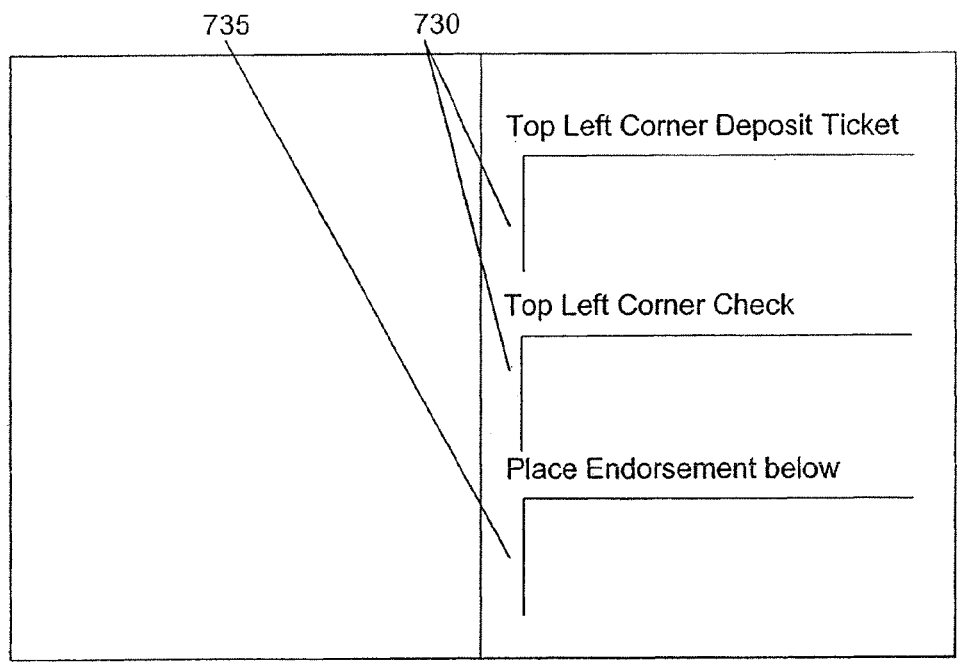

FIG. 7 depicts a single sided carrier. The carrier has a sealing transparent cover and a opaque back 700, and incorporates a sequence number 705, bar code 710, test pattern 715, a processed legend 720 transferred from the inside of the front cover to the check with a notation to rub to seal carrier 725, a place with registration marks 730 and adhesive for affixing the deposit ticket and check, and a designated area 735 where the endorsement can be applied.

Alternatively, the carrier may be a normal sheet of paper with a sequence number, bar code, test pattern, places to adhere the deposit ticket and check, and a place for the endorsement. By elimination of a clear plastic overlay on top of the check, issues such as image degradation due to reflection from the plastic and miss feeds due to a poor match between the friction of the plastic versus a normal paper carrier would be avoided. The user would transfer to the check the processed legend by removing a sticker from elsewhere on the carrier, and placing it on the check in the appropriate area. A user could also place the legend on the check using one of the other methods described earlier.

Deposit Information Written Directly on Carrier

Rather than insert or attach a preprinted deposit ticket into the carrier, the carrier could have a white area where standard information normally found on a deposit ticket could be preprinted and provision made for entering the variable information.

Figure 8:
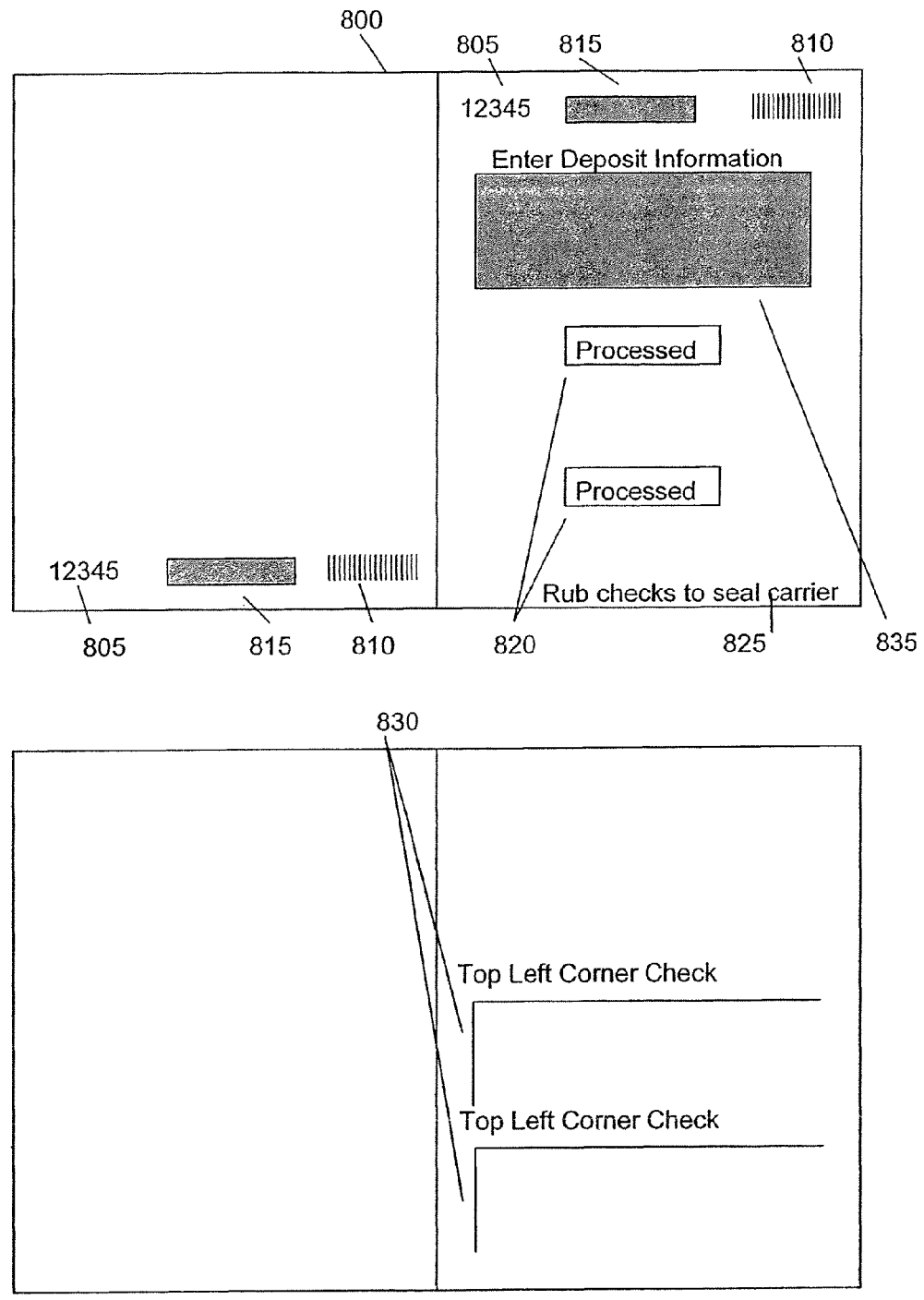
FIG. 8 depicts a carrier having deposit information.

FIG. 8 depicts a carrier having deposit information. The carrier has a sealing transparent cover 800, and incorporates a sequence number 805, bar code 810, test pattern 815, a processed legend transferred from the inside of the front cover to the check 820 and an indicator 825 to rub carrier to seal, a place with registration marks and adhesive for affixing the deposit ticket and check(s) 830, and an white area 835 where standard information is preprinted on the carrier and variable information is entered.

The standard information could include account holder name and address, bank name and address, and account number in MICR type. The variable information is typically the date of deposit, check amount(s), and a deposit total.

Constraint boxes, often used on deposit tickets today, can be printed on the carrier to improve the readability of hand printed characters. Other devices to improve machine-readability of data include: using mark sense codes in lieu of hand writing check amounts and deposit total, or providing depositors with a computer program that prints out the carrier and/or deposit ticket with OCR compatible characters or bar codes. Such a computer program would need to be developed to match the specific carrier design to be used. While using a computer program to print the carrier will improve the readability of data it does add a step to the process and requires a PC and printer. It can have the further advantage of simplifying manufacture and distribution since generic carriers can be used and only customized with sequence numbers and bar codes and other data at the time of printing.

Other Carrier Variants and Uses

Carriers may also be used with devices that simultaneously scan both sides. In such application the ability to pair carrier fronts and backs may not be important, but other features (e.g., skew control) may be.

The carriers can also be produced in non-sealing variations that are intended for reuse. These while offering a lower level of security and a higher level of convenience could be acceptable in some applications, or to some banks This option would not be available in carriers where variable information is written directly on the carrier or an endorsement is stamped.

Example Process

Figure 9:
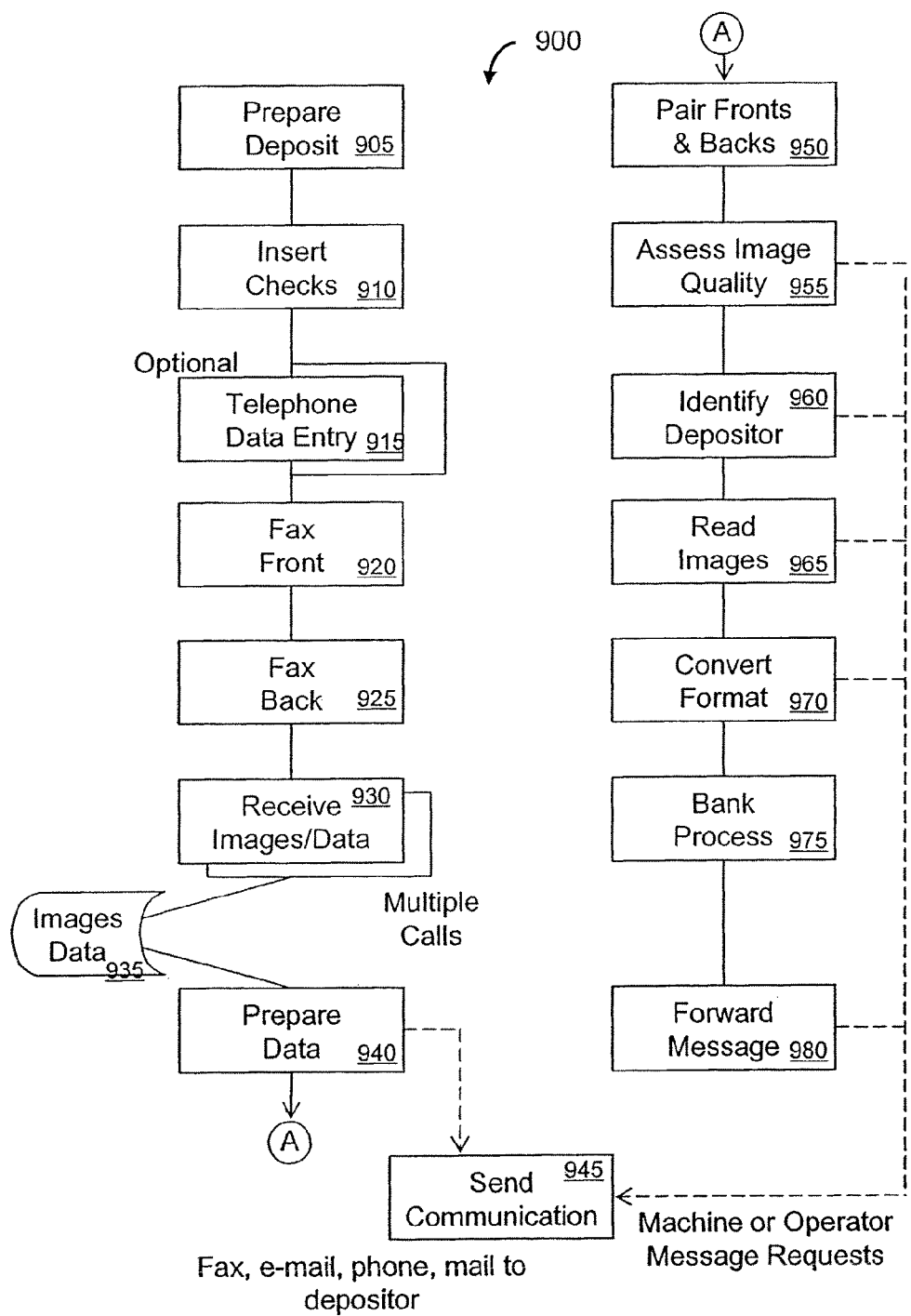
FIG. 9 shows an example process for transmitting a negotiable instrument to a remote location.

FIG. 9 shows an example process 900 for transmitting a negotiable instrument to a remote location. A fax is sent by a PC with scanner attached, the sending process is different, but the preparation and processing of the images by the receiving system are the same.

Prepare Deposit (Step 905)

The user prepares the deposit in much the same way as a deposit to be made at a bank branch. Checks are assembled and depending on the type of carrier used: endorsed on the back, not endorsed, or the endorsement placed on the front of the carrier. Either a deposit ticket is prepared, or check amounts and the deposit total are written on the deposit ticket area incorporated into the carrier.

Insert Checks (Step 910)

Checks and a deposit ticket (if used) are inserted into or attached to the carrier.

Telephone Data Entry (Step 915)

The user, using a fax machine, calls the bank's number and following the prompts either key enters or speaks to a voice response unit the requested information. The information can include some or all of the following: carrier number, side, depositor account number, deposit total, and for each check the amount, routing, account number, and check number. This information will be used to enhance the reading of these numbers off the check image. It is useful to note that this step is not required.

Fax Front (Step 920)

The carrier is placed with the front side down in the fax machine. If telephone data entry has not been used, the user calls the bank's number. The user starts transmission. When a PC is used with a flat bed scanner, or similar device, the depositor follows the instructions for preparing a fax. It may be possible to scan both the front and backsides before sending the fax.

Fax Back (Step 925)

If necessary insert the back side of the carrier into the fax machine and initiate a second fax transmission.

Receive Images and Data (Step 930)

An Image Receiving and a Preprocessing Unit accepts the depositors call, logs the calling number (source ISDN); and if telephone data entry is used, provides prompts for required data and records that data. Receives the fax image applying the usual fax quality tests and advises the sending machine if the transmission is not acceptable. This test is different than later tests performed to determine if the image is suitable for check image processing. If the front and back of the carrier are sent in separate transmissions the step is repeated.

Store Images/Data (Step 935)

Calling number, fax machine ID, transmitted images and data are temporarily stored.

Prepare Data (Step 940)

The fax image is broken down based primarily on location on the carrier into components: carrier number, test pattern, bar code, image deposit information, image check 1 side 1, image check 2 side 1, image check 1 side 2, image check 2 side 2, endorsement (single sided carrier), etc. The sequence number, side identifier (if present) and/or bar code are read. If automated means cannot identify the components or read the data—they are referred to an operator. If the operator is unsuccessful a deposit failure message is sent to the depositor by fax, e-mail, phone etc (Send Communications, Step 945).

Send Communication (Step 945)

Communication with the user that is not handled directly by the fax to fax machine protocol requires sending the message by fax, e-mail, phone, or mail. The method chosen depends on the nature of the message, which can be originated at a number of steps in the process, and user preferences. Messages may be generated by the system or by the human operator which processes exceptions.

Pair Check Fronts and Backs (Step 950)

Printed on the carrier are: carrier type, if more then one type is allowed by system; sequence number (front and back); and side identification (either by a side code or by different positioning of the sequence number on front and back. This information is used to associate the fronts and backs of two sided carriers. Single sided carrier images/data are released for processing as soon as the components have been identified. Two sided carrier data is released as soon as both sides have been received, components identified, and associated.

Assess Image Quality (Step 955)

A number of products are commercially available for assessing check image quality; and could be licensed for inclusion in the preprocessing unit. If the software assessment indicates a problem, rather than return the item immediately a human operator could view the image and make a final determination. If an image lacks sufficient quality even after image enhancement efforts, such as using a test pattern (as described in the carrier features section), the depositor would be notified to refax the carrier or take the it to the nearest branch for processing.

Identify Depositor (Step 960)

The account number is read off the deposit ticket or deposit information area of the carrier using commercially available software products, and optionally using "hint algorithms to improve the quality of the read. For Fax submissions, the system compares the calling phone number, and transmitted Fax ID and Fax phone number with information on file for the account number on the deposit ticket. A further confirmation test could be performed if a database is maintained relating specific carriers to an individual depositor/account. This could be interrogated to see if the carrier being used had been issued to the depositor. A failure to match on the above tests would trigger deposit rejection and/or or a call to the depositor.

Read Images (Step 965)

At this point in the process, off the image of the carrier the following have already been read: the carrier number; carrier type and side designation (if present); and depositor account number. In this step, each check image must be examined to determine in the "Processed" notation is properly on each check. If not the deposit is either rejected by the system or given to an operator for a decision.

In a particular implementation, how much more must be read depends on what the bank's image receiving unit is expecting. The receiving unit will always want the front and back images of the check. Some carrier types have the endorsement on the front of the carrier, or depend on the system adding a depositor specific endorsement to a system created image of the back of the check. If those optional steps are necessary they are carried out at this time. Some bank systems may expect as data fields: the MICR line of the check, and as read off the deposit ticket and/or optionally as entered, the amounts of individual checks and the total deposit amount.

Other bank's image receiving units may expect more of the processing be done for them. For example, the courtesy amount and legal amount could be read off the check; compared to each other and to the amount read off the deposit ticket and/or the amount entered by telephone. They should all be the same. Any exceptions could be processed automatically with a deposit rejection message, or handled by an operator who communicates with the depositor.

While in many cases the check images presented by the bank for clearing must meet image quality standards, there are some things that can be done to facilitate successful machine courtesy amount read (CAR), legal amount read (LAR), and deposit ticket read; and thus reduce the need for operator intervention. Even with a compromised fax image, "OCR hinting" algorithms can be used to improve the success of machine proofing of the check and deposit without any loss of security, but with much to gain by eliminating or limiting the need for human proofing. The word "hinting" as used in our invention has a particular meaning In the context of our invention, we mean that when the OCR engine that examines the image we have sent attempts to extract the data (e.g. check amount) from the image it will have available to it the sender's interpretation of the data. In such a case, the computational task of the OCR engine is simpler than "blind" recognition. With "hints" provided, the OCR engine can focus on proofing the data in the image with the hints and render an opinion on the likelihood that the hint matches the data in the image.

One source of "OCR hint" data might be check and deposit information provided over the telephone just prior to or just after the faxing of the check carrier. This telephone interaction could be by using the DTMF (i.e. Touch-Tone) keys on the telephone or by voice recognition. For example, the information entered by telephone could include: the serial number of the deposit ticket or carrier, the routing, account number, check number and amount of each check to be deposited, and the deposit total.

Convert Format (Step 970)

Existing banks remote check image capture systems are designed to work with specific check image capture devices. These systems have either been developed by individual banks, or use commercially available hardware and software. Their data/image formats are different from those used for faxes. Therefore in order to interface with existing processes format conversion is necessary. If desired, provide to the depositor a receipt, subject to proof of deposit and collection (the same condition that apply to a branch deposit receipt).

Bank Process (Step 975)

With image quality checked, check front and backs paired, image and data converted to the form expected by the bank's image receiving unit, fax image deposits are processed in much the same way as are deposits made using traditional check scanning devices.

Forward Message (Step 980)

The preprocessing function interfaces with the banks existing remote capture image receiving/processing system and through it with the deposit proving (e.g., validating). There may be a need for these units to communicate with the depositor. If desired these can be routed through the preprocessing unit, which forwards the message changing modes as may be required (e.g. converting an e-mail message to a fax or an automated voice call).

Redeposit Prevention

Redeposit is prevented in a number of ways. Items deposited through the system a second time can be detected by comparing bank, account number, check number and amount data for each check to those already processed. In addition, the carrier's unique coding/number can be used to detect duplicate deposits. As an option, at the time of carrier distribution specific carrier numbers can be associated with individual customers, their fax machine and/or telephone line for added security.

The following features reduce the chance of a check being re-deposited at a branch or at another bank.

The check is retained (attempting to remove it would damage the check) in the carrier which has "Processed" or some similar notation preprinted on it;

The carrier transfers a non removable (without damaging the check) sticker with the words "Processed" or such similar notation, and optionally the carrier's unique identifier, or The carrier transfers via ink the words "Processed" or such similar notation, and optionally the carrier's unique identifier to the check.

The carrier may be so designed that from the transmitted/received image it can be determined: 1) the carrier has been properly sealed, thus preventing reuse; and 2) the "Processed" sticker or ink imprint has been successfully transferred to the check. In the case of some difficulty with the remote deposit the customer can still bring the carrier encased check or the "Processed" marked check to a branch for deposit.

Comparison to Traditional Remote Check Image Capture Methods Traditional Remote Capture Device:

Traditional—Remote Check Image Scanning—requires acquisition of a standalone device or a check scanner for use with an existing PC. Keyboard input is possible. On screen visual verification of image quality can be done, if desired. Often the scanner can MICR read rather than OCR read the MICR data. A receipt may be printed. The scanner may endorse the check and print some legend such as "Processed" on the face of the check. Password protection is possible. Generally the images and data are encrypted and delivered via the Internet.

FAX Imaging—Existing equipment is used (e.g. fax machine, flat bed scanner attached to PC). Scanned images (in fax or other format) may be submitted to the bank via a point to point telephone connection, via the Internet or by other network means. In the first case the calling number can be identified via ISDN and verified to be that registered to a particular customer. Image quality should be good since a low-speed scanning device is used and a fax test pattern may be employed to help the receiving software produce a high quality image. Before inserting into the carrier, checks are manually endorsed as is done when making a branch deposit. The carrier performs many of the functions the traditional device performs (e.g., enables two sided processing by keeping the front and back of a check together, marks checks as "Processed", identifies the customer).

Network

Traditional—Internet and direct dial up.

FAX Imaging—Direct dial up and Internet. Since direct dial up is the predominant way fax machines communicate, it is likely to be the dominant method for sending check images to the bank.

Image Receipt and Preprocessing

Traditional—Provide delivery receipt and preliminary acceptance of image quality by software.

FAX Imaging—Verify sender (optional) using: the fax identification and phone number entered into the fax machine, and/or calling phone number to relate the device to a specific customer. Caller ID cannot be blocked on an 800 number, and is not applicable to Internet transmission. Pair individual front and back images, which may have been transmitted separately and confirm image quality. Apply image enhancement (optional) using the fax test pattern included on the carrier. Convert images from fax or other standard to the format required for further processing or for submission to other banks Provide delivery receipt via fax, e-mail, or other means.

Deposit Proof

Traditional—For each check compare CAR (Courtesy Amount Read)/LAR (Legal Amount Read) and keyed in or written deposit ticket amount; and calculate totals and compare to customer provided total. Amounts that do not match or cannot be optically read by the system off the image, or deposits that do not balance require operator intervention. The customer is informed of any deposit adjustments by e-mail, fax or phone.

FAX Imaging—For each check compare CAR (Courtesy Amount Read)/LAR (Legal Amount Read) and keyed in, written, or otherwise transmitted deposit ticket amount; calculate totals and compare to customer provided total. The carrier has either a place for the deposit ticket to be inserted or a place on the carrier where deposit information can be written or otherwise provided. Amounts that do not match or cannot be optically read by the system off the image, or deposits that do not balance require operator intervention in the same way as for traditional. The customer is informed of any deposit adjustments by e-mail, fax or phone. It is possible a higher percentage of deposits may require operator intervention than under the traditional method, the cost of which would be covered in the pricing.

Avoiding Duplicate System Deposits

Traditional—Compare checks in deposit to checks already received.

FAX Imaging—Compare checks in deposit to checks already received. Also compare carrier numbers.

Avoiding Duplicate Branch Deposits

Traditional—Imaged checks are often marked with "Processed" or some similar notation on the face. Checks marked as "Processed", which have not actually been successfully deposited, could be accepted by the branch after verifying this is not a redeposit.

FAX Imaging—Checks to be imaged may be marked with "Processed", or a similar notation, on the face; or checks are sealed in the carrier before scanning Checks marked as "Processed", which have not actually been successfully deposited, would be accepted by the branch after verifying this is not a redeposit. Checks sealed in a carrier could be scanned without removal from the carrier at the branch or bank's operations center.

Check Damaged Beyond Repair

Traditional—Customer would have to go back to issuer.

FAX Imaging—Customer would have to go back to issuer.

Customer Indemnification of Bank

Traditional—Required. Know your customer applies.

FAX Imaging—Required. Know your customer applies.

What is claimed is:

1. A system for remote depositing of a plurality of negotiable instruments comprising:
a carrier for receiving the plurality of negotiable instruments, the carrier having an identifier on a front and back side of the carrier, the identifier being independent of data on the negotiable instruments and unique to the carrier, and the carrier being designed to permit one front image of all the negotiable instruments, and one back image of all the negotiable instruments to be generated;
an imaging device for separately generating and transmitting one electronic front image of all the negotiable instruments and one electronic back image of all the negotiable instruments and the unique identifier, while the negotiable instruments are secured to the carrier;
a link configured to permit the image device to be in communication with a network for directing the front and back electronic images to a remote location for subsequent pairing of the front and back images of the negotiable instruments using the unique identifier; and
a receiving unit at the remote location for receiving the separately transmitted front and back images of the negotiable instruments, the receiving unit having memory for storing the received images and having software designed to break down the individual front and back images of all negotiable instruments from the one front image of all the negotiable instruments and one back image of all the negotiable instruments and subsequently pair the front image of each negotiable instrument having the associated unique identifier to a separately received corresponding back image of the corresponding negotiable instrument having the associated unique identifier, so as to provide a complete image of each negotiable instrument.

2. The system of claim 1 wherein the carrier further includes one of: a transparent sealing carrier, transparent non-sealing carrier having pockets, transparent non-sealing carrier without pockets, a non-transparent cut-out carrier, a transparent carrier with an inserted negotiable instrument, a single sided carrier, and two sided carrier.

3. The system of claim 1 wherein the carrier further includes one of: a seal to retain the negotiable instrument therewith, an identifier to indicate the negotiable instrument is processed, or a feature to permit alignment of the negotiable instrument in a specified manner.

4. The system of claim 1 wherein the negotiable instrument is a check or deposit slip.

5. The system of claim 1 wherein the image device includes one of a fax, a scanner, a device designed to transmit electronic data, other image devices compatible with ITU-T recommendations T.30 or T.4, other communications protocols compatible with banking industry standards, or combination thereof.

6. A system for remote depositing of a plurality of negotiable instruments comprising:
a carrier for receiving the plurality of negotiable instruments and designed to permit one front image of all the negotiable instruments and one back image of all the negotiable instruments, when the negotiable instruments are secured to the carrier, to be generated, the carrier having an identifier independent of data on the negotiable instruments and unique to the carrier, and a surface area for providing deposit information;
an imaging device for separately generating and transmitting one electronic front image of all the negotiable instruments one electronic back image of all the negotiable instruments and the unique identifier, while the negotiable instruments are secured to the carrier;
a link configured to permit the image device to be in communication with a network for directing the front and back electronic images to a remote location for subsequent pairing of the front and back images of the negotiable instruments using the unique identifier; and
a receiving unit at the remote location for receiving the separately transmitted front and back images of the negotiable instruments, the receiving unit having memory for storing the received images and having software designed to break down the individual front and back images of all negotiable instruments from the one front image of all the negotiable instruments and one back image of all the negotiable instruments and subsequently pair the front image of each negotiable instrument having the associated unique identifier to a separately received corresponding back image of the corresponding negotiable instrument having the associated unique identifier, so as to provide a complete image of each negotiable instrument.

7. The system of claim 6 wherein the carrier further includes one of: a transparent sealing carrier, transparent non-sealing carrier having pockets, transparent non-sealing carrier without pockets, a non-transparent cut-out carrier, a transparent carrier with an inserted negotiable instrument and two sided carrier.

8. The system of claim 6 wherein the carrier further includes one of: a seal to retain the negotiable instrument therewith, an identifier to indicate the negotiable instrument is processed, or a feature to permit alignment of the negotiable instrument in a specified manner.

9. The system of claim 6 wherein the negotiable instrument is a check or deposit slip.

10. The system of claim 6 wherein the image device includes one of a fax, a scanner, a device designed to transmit electronic data, other image devices compatible with ITU-T recommendations T.30 or T.4, other communications protocols compatible with banking industry standards, or combination thereof.

* * * * *